United States Patent
Sung et al.

(10) Patent No.: US 11,238,279 B2
(45) Date of Patent: Feb. 1, 2022

(54) METHOD FOR GENERATING PLURAL INFORMATION USING CAMERA TO SENSE PLURAL WAVE BANDWIDTH AND APPARATUS THEREOF

(71) Applicant: SAMSUNG ELECTRONICS CO., LTD., Suwon-si (KR)

(72) Inventors: Woontahk Sung, Suwon-si (KR); Hwayong Kang, Suwon-si (KR); Jongsun Kim, Suwon-si (KR); Kihuk Lee, Suwon-si (KR); Bongchan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 16/289,910

(22) Filed: Mar. 1, 2019

(65) Prior Publication Data
US 2019/0272423 A1 Sep. 5, 2019

(30) Foreign Application Priority Data
Mar. 2, 2018 (KR) .................. 10-2018-0025334

(51) Int. Cl.
*G06K 9/00* (2006.01)
*H04N 5/225* (2006.01)
*H04N 5/232* (2006.01)

(52) U.S. Cl.
CPC ....... *G06K 9/00604* (2013.01); *G06K 9/0061* (2013.01); *H04N 5/2254* (2013.01);
(Continued)

(58) Field of Classification Search
CPC ................ H04N 5/332; H04N 9/04553; H01L 27/14652; H01L 27/14649; H01L 27/14875; G06K 9/00604; G06K 9/0061
See application file for complete search history.

(56) References Cited

U.S. PATENT DOCUMENTS

2012/0212597 A1 8/2012 Hanna
2013/0277533 A1 10/2013 Olsen et al.
(Continued)

FOREIGN PATENT DOCUMENTS

| JP | 2017-515251 | 6/2017 |
| KR | 10-2015-0037628 A | 4/2015 |
| KR | 10-2017-0015160 | 2/2017 |

OTHER PUBLICATIONS

Search Report and Written Opinion dated Jun. 10, 2019 in counterpart International Patent Application No. PCT/KR2019/002427.
(Continued)

*Primary Examiner* — Vincent Rudolph
*Assistant Examiner* — Raphael Schwartz
(74) *Attorney, Agent, or Firm* — Nixon & Vanderhye P.C.

(57) ABSTRACT

According to various embodiments, an electronic device may include a first light emitter comprising first light emitting circuitry configured to output light of a first wave bandwidth, a second light emitter comprising second light emitting circuitry configured to output light of a second wave bandwidth, a camera including an image sensor configured to arrange one or more first pixels for sensing the light corresponding to the first wave bandwidth and the second wave bandwidth and one or more second pixels for sensing the light corresponding to the second wave bandwidth, and a processor. The processor may be configured to control the electronic device to output the first wave bandwidth light using a first light source and the second wave bandwidth light using a second light source, and a control circuit electrically coupled to the image sensor and connected to an application processor through a designated interface. The control circuit may be configured to obtain image data of an external object using the camera from the first wave bandwidth light and the second wave bandwidth light reflected from the external object, to generate first
(Continued)

image data of the external object using a difference between first pixel data corresponding to the one or more first pixels and second pixel data corresponding to the one or more second pixels of the image data, to generate second image data of the external object by binning the second pixel data corresponding to the one or more second pixels of the image data, and to transmit the first image data and the second image data to the processor through the designated interface, wherein the processor is configured to generate authentication information based on the first image data and to generate depth information using the second image data.

15 Claims, 10 Drawing Sheets

(52) U.S. Cl.
CPC ....... *H04N 5/2256* (2013.01); *H04N 5/23229* (2013.01); *H04N 5/23248* (2013.01)

(56) References Cited

U.S. PATENT DOCUMENTS

| | | |
|---|---|---|
| 2015/0205992 A1 | 7/2015 | Rowe |
| 2015/0227790 A1 | 8/2015 | Smits |
| 2015/0245767 A1* | 9/2015 | Northcott ............. A61B 3/1216 351/206 |
| 2015/0304535 A1* | 10/2015 | Smits ..................... G06K 9/228 348/78 |
| 2017/0034456 A1 | 2/2017 | Kyung et al. |
| 2017/0134704 A1* | 5/2017 | Otsubo ............. H01L 27/14645 |
| 2017/0185839 A1 | 6/2017 | Kim et al. |
| 2017/0243075 A1 | 8/2017 | Hanna |
| 2017/0366761 A1 | 12/2017 | Dainty et al. |

OTHER PUBLICATIONS

Extended European Search Report dated Mar. 5, 2021 for EP Application No. 19761516.4.

* cited by examiner

METHOD FOR GENERATING PLURAL INFORMATION USING CAMERA TO SENSE PLURAL WAVE BANDWIDTH AND APPARATUS THEREOF

CROSS-REFERENCE TO RELATED APPLICATION

This application is based on and claims priority under 35 U.S.C. § 119 to Korean Patent Application No. 10-2018-0025334, filed on Mar. 2, 2018, in the Korean Intellectual Property Office, the disclosure of which is incorporated by reference herein in its entirety.

BACKGROUND

1. Field

The present disclosure relates to an apparatus and a method for acquiring and processing images of different wave bandwidths at the same time in an electronic device.

2. Description of Related Art

As an electronic device improves in performance, various services and additional functions provided by the electronic device are increasing. To raise usefulness of the electronic device and to satisfy users' various needs, various applications available at the electronic device are developed.

Such applications are related to camera functionality, and the user may take his/her self-portrait or a background using a camera module on the electronic device.

The camera module of the electronic device may be used for biometrics or vision recognition. The electronic device may use a plurality of images for the biometrics or the vision recognition. For example, a camera module used for iris scanning may scan a user's iris image (e.g., a first image) by use of light of about 850 nm. A camera module for recognizing an object by avoiding outdoor light noise of an outdoor environment may recognize an object (e.g., a second image) by use of light of about 940 nm.

To perform functions using the light of different bandwidths, for example, the iris scanning function and depth measurement function in one electronic device, the electronic device requires at least two camera modules specialized for the respective wave bandwidths. To acquire a plurality of images, the electronic device obtains the images by sequentially driving the camera modules and processes the images in sequence, which lengthens image processing time.

SUMMARY

Embodiments of the disclosure address the above-discussed deficiencies of the prior art by providing an apparatus and a method for acquiring and processing a plurality of images having different wave bandwidths at the same time in an electronic device.

Another example aspect of the present disclosure is to provide an apparatus and a method for acquiring both an iris image and depth information in real time in an electronic device.

Yet another example aspect of the present disclosure is to provide an apparatus and a method for acquiring and processing a plurality of images having different wave bandwidths at the same time through an image sensor in an electronic device which includes the image sensor including a plurality of pixels for sensing optical signals having different wave bandwidths.

According to an example aspect of the present disclosure, an electronic device may include a first light emitter comprising first light emitting circuitry configured to output light of a first wave bandwidth, a second light emitter comprising second light emitting circuitry configured to output light of a second wave bandwidth, a camera including an image sensor configured to arrange one or more first pixels for sensing the light corresponding to the first wave bandwidth and the second wave bandwidth and one or more second pixels for sensing the light corresponding to the second wave bandwidth, and a processor. The processor may be configured to control the electronic device to output the first wave bandwidth light using a first light source and the second wave bandwidth light using a second light source, and a control circuit electrically coupled to the image sensor and connected to the processor through a designated interface. The control circuit may be configured to obtain image data of an external object using the camera from the first wave bandwidth light and the second wave bandwidth light reflected from the external object, to generate first image data of the external object using a difference between first pixel data corresponding to the one or more first pixels and second pixel data corresponding to the one or more second pixels of the image data, to generate second image data of the external object by binning the second pixel data corresponding to the one or more second pixels of the image data, and to transmit the first image data and the second image data to the processor through the designated interface, wherein the processor is configured to generate authentication information based on the first image data and to generate depth information using the second image data.

According to another example aspect of the present disclosure, a method for generating an image in an electronic device may include generating first light of a first wave bandwidth and second light of a second wave bandwidth, obtaining image data of an external object from light reflected from the external object using an image sensor which arranges one or more pixels for sensing the light corresponding to the first wave bandwidth and the second wave bandwidth and one or more second pixels for sensing the light corresponding to the second wave bandwidth, generating first image data of the external object using a difference between first pixel data corresponding to the one or more first pixels and second pixel data corresponding to the one or more second pixels of the image data, generating second image data of the external object by binning the second pixel data corresponding to the one or more second pixels of the image data, and transmitting the first image data and the second image data to an application processor through a designated interface, to generate authentication information based on the first image data and to generate depth information using the second image data.

According to yet another example aspect of the present disclosure, an electronic device may include a first light emitter comprising first light emitting circuitry configured to output light of a first wave bandwidth, a second light emitter comprising second light emitting circuitry configured to output light of a second wave bandwidth, a camera including an image sensor, and a processor configured to control the electronic device to output the light of the first wave bandwidth using a first light source and to output the light of the second wave bandwidth using a second light source, to generate a first image using a difference between a first pixel and a second pixel, and to generate a second image by binning the second pixel. The image sensor may include a pixel array which includes first pixels for detecting and transforming the light of the first wave bandwidth and the second wave bandwidth to an electric signal, filters configured to pass the light of the second wave bandwidth, and second pixels for detecting and transforming the filtered second wave bandwidth light to an electric signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Various example embodiments of the present disclosure will be described herein with reference to the accompanying drawings. In the following description, well-known functions or constructions may not described in detail if they would obscure the disclosure in unnecessary detail. Terms described below, which are defined considering functions in the present disclosure, may be different depending on user and operator's intention or practice. Therefore, the terms should be understood based on the entirety of the disclosure.

Figure 1:
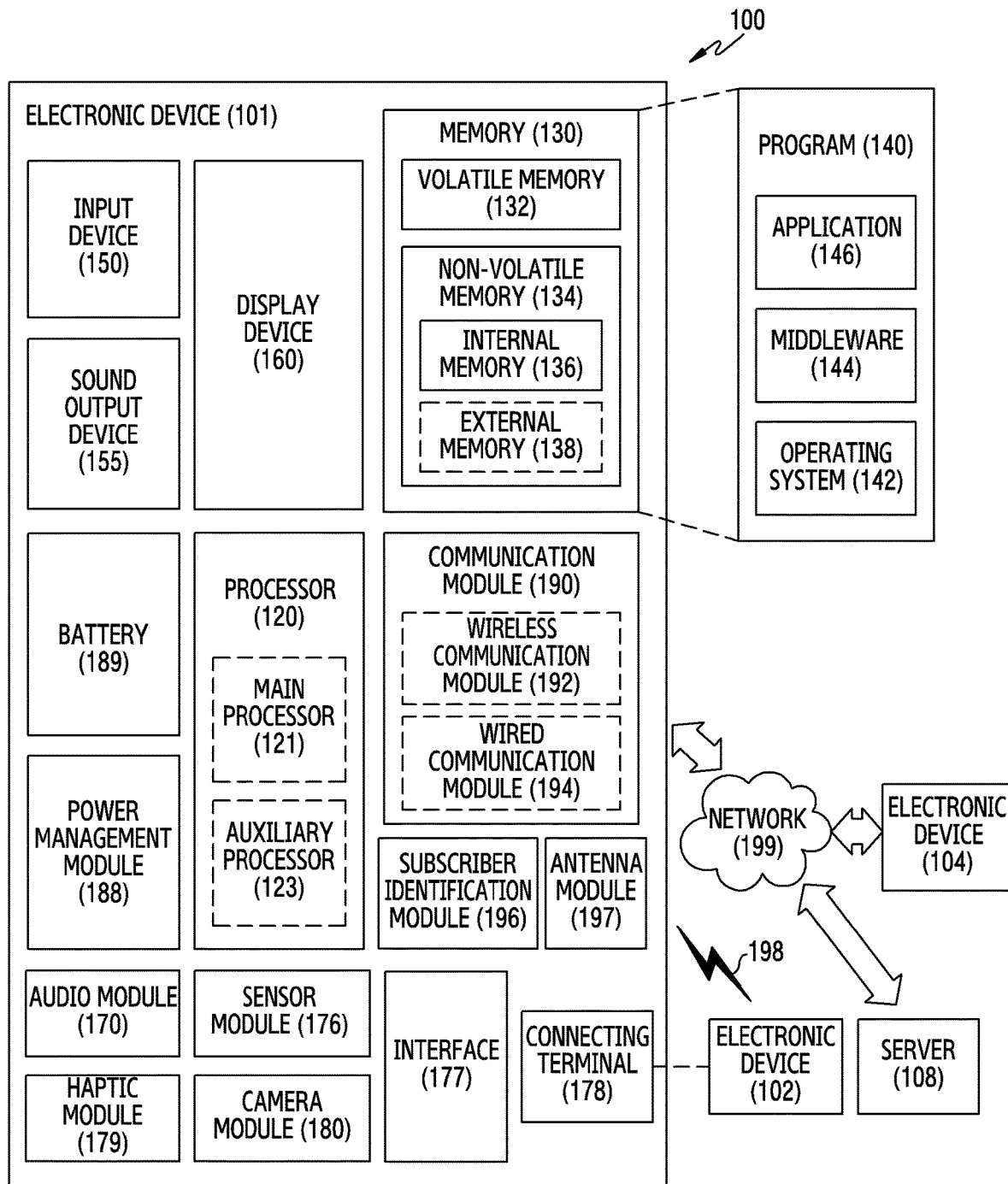
FIG. 1 is a block diagram illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
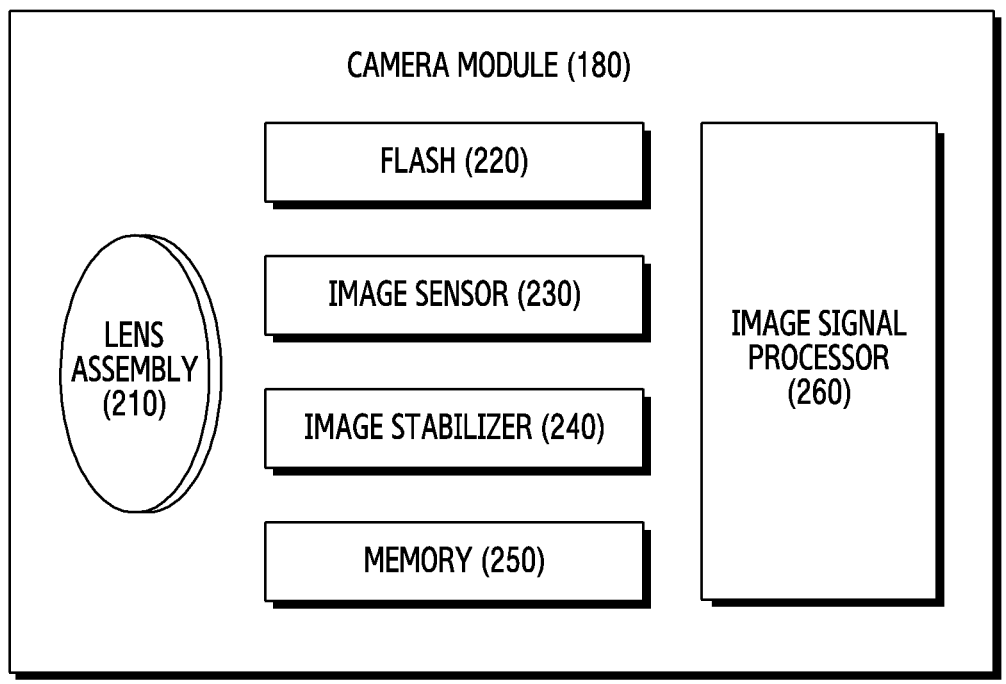
FIG. 2 is a block diagram illustrating an example camera module according to various embodiments.

FIG. 2 is a block diagram illustrating an example camera module according to various embodiments.

Referring to FIG. 2, the camera module 180 may include a lens assembly 210, a flash 220, an image sensor 230, an image stabilizer (e.g., including image stabilizing circuitry) 240, memory 250 (e.g., buffer memory), and/or an image signal processor (e.g., including image signal processing circuitry) 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include, for example, and without limitation, one or more light emitting diodes (LEDs) (e.g., a red-green-blue (RGB) LED, a white LED, an infrared (IR) LED, or an ultraviolet (UV) LED), a xenon lamp, or the like.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as, for example, and without limitation, an RGB sensor, a black-and-white (BW) sensor, an IR sensor, a UV sensor, a plurality of image sensors having the same attribute, a plurality of image sensors having different attributes, or the like. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various processing circuitry and perform one or more image processing with respect to an image obtained via the image sensor 230 or an image stored in the memory 250. The one or more image processing may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, or softening), or the like. The image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
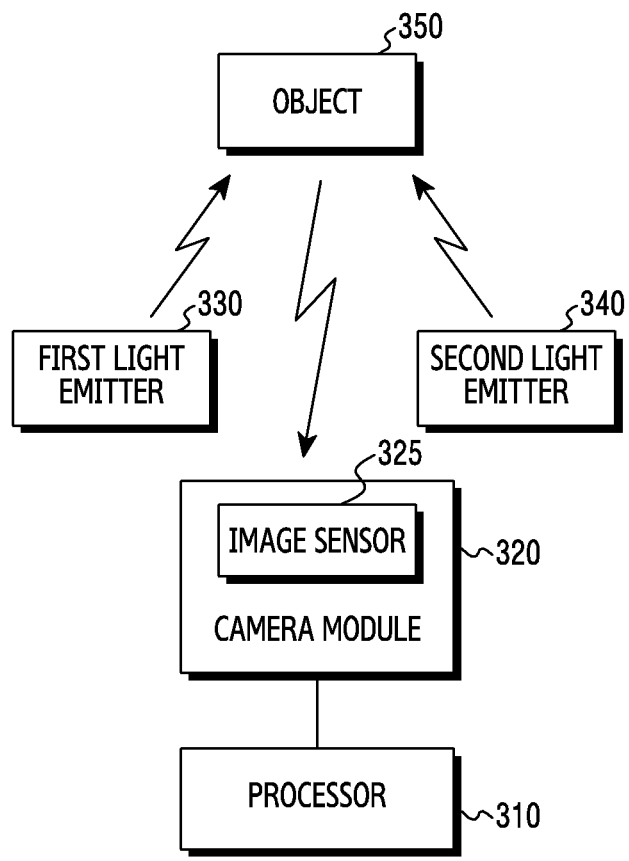
FIG. 3 is a diagram illustrating an example electronic device according to various embodiments.

FIG. 3 is a diagram illustrating an example electronic device according to various embodiments.

Referring to FIG. 3, the electronic device (e.g., the electronic device 101 of FIG. 1) may include a first light emitter (e.g., including first light emitting circuitry) 330, a second light emitter (e.g., including second light emitting circuitry) 340, a camera module 320, and a processor (e.g., including processing circuitry) 310.

The first light emitter 330 and the second light emitter 340 may each include corresponding light emitting circuitry and output light of different wave bandwidths. For example, the first light emitter 330 and the second light emitter 340 may be infrared light emitting diodes (LEDs), but the disclosure is not limited thereto. For example, if the electronic device allows iris scanning, the first light emitter 330 may output light of a wave bandwidth suitable for the iris scanning and the second light emitter 340 may output light of a wave bandwidth suitable for depth information acquisition. According to various embodiments, the first light emitter 330 and the second light emitter 340 may sequentially output the light of the corresponding wave bandwidth, or simultaneously output the light of the corresponding wave bandwidth. According to an embodiment, the electronic device may drive both of the first light emitter 330 and the second light emitter 340 to emit light of a first wave bandwidth and light of a second wave bandwidth to an external object 350.

The camera module 320 (e.g., the camera module 180 of FIG. 1) may include an image sensor 325 for generating pixel information by receiving the light of the first wave bandwidth and the light of the second wave bandwidth reflected from the object 350. The image sensor 325 (e.g., the image sensor 230 of FIG. 2) may include a filter and pixels. The filter may include a filter for passing the light of the first wave bandwidth and the second wave bandwidth and/or a filter for passing the light of the second wave bandwidth. The pixels may include first pixels for recognizing the light of the first wave bandwidth and the second wave bandwidth and second pixels for recognizing the light of the second wave bandwidth. The first pixels and the second pixels may be arranged as a pixel array in a grid structure.

For example, the image sensor 325 may include the first pixels for recognizing the light of the first and second wave bandwidths, the filter for passing the light of the second wave bandwidth, and the second pixels for recognizing the filtered light of the second wave bandwidth.

For example, the image sensor 325 may include a first filter for passing the light of the first and second wave bandwidths, and first pixel sensors configured to sense the filtered light of the first and second wave bandwidths. The image sensor 325 may include a second filter for passing the light of the second wave bandwidth, and second pixel sensors configured to sense the filtered light of the first and second wave bandwidth.

The processor 310 may include various processing circuitry and control the first light emitter 330, the second light emitter 340, and the camera module 320, and may process images captured by the camera module 320. For example, the processor 310 may be the processor 120 of FIG. 1. For example, the processor 310 may be the image signal processor 260 of FIG. 2.

The processor 310 may control the electronic device to emit first light of the first wave bandwidth and second light of the second wave bandwidth by controlling both of the first light emitter 330 and the second light emitter 340. The processor 310 may receive, through the image sensor 325, pixel information based on the light of the first and second wave bandwidths which are reflected from an external object, and thus obtain image data of the external object 350. The processor 310 may generate first image data of the external object, using difference between signals of the first and second wave bandwidths obtained at the first pixel sensors and signals of the second wave bandwidth obtained at the second pixels in the image data. The first image data may be image data based on the signals of the first wave bandwidth. The processor 310 may generate second image data of the external object 350 by binning second pixel information obtained from one or more second pixels in the image data. The second image data may be image data based on the signals of the second wave bandwidth. The processor 310 may generate authentication information based on the first image data, and generate depth information using the second image data.

According to an embodiment, if the processor 310 is an image signal processor (e.g., the image signal processor 260 of FIG. 2) of the camera module, the processor 310 may generate first image data and second image data and transfer the generated first image data and second image data to an application processor (e.g., the processor 120 of FIG. 1) through an interface. The application processor may perform authentication based on the first image data and the second image data.

According to an embodiment, if the processor 310 is a processor (e.g., the processor 120 of FIG. 1) of the electronic device, the processor 310 may obtain first pixel information and second pixel information through the camera module 320, and generate first image data and second image data based on the obtained first and second pixel information. The processor 310 may perform the authentication based on the generated first and second image data.

Figure 4:
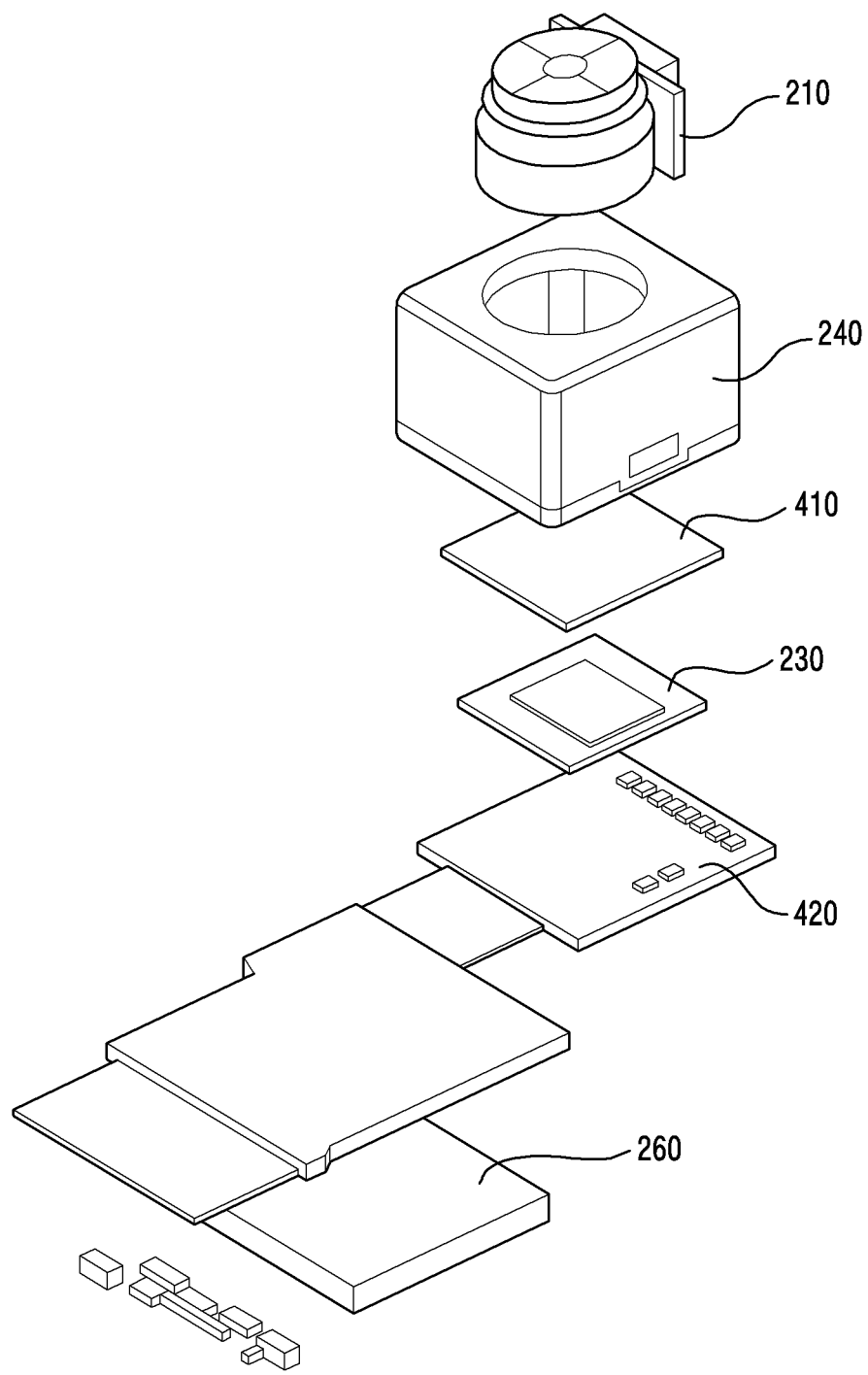
FIG. 4 is an exploded perspective view illustrating an example structure of a camera module according to various embodiments.

FIG. 4 is an exploded perspective view illustrating an example structure of a camera module 180 according to various embodiments.

Referring to FIG. 4, the camera module 180 may include at least one of a lens assembly 210, an image stabilizer 240, a filter 410, an image sensor 230, a printed circuit board 420, and an image signal processor (e.g., including image processing circuitry) 260.

The filter 410 may include a band pass filter which passes only specific band light or a band stop filter which rejects specific band light. According to an embodiment, the filter 410 may be disposed under the lens assembly 210, that is, inside the camera module 180. Hence, at least part of the light passing the lens assembly 210 may be rejected by the filter 410. For example, if the filter 410 is the band pass filter which passes only infrared band light, the filter 410 may pass only the infrared band light of the light passing the lens assembly 210. According to an embodiment, the filter 410 may be configured to reject visible light and pass the infrared light (the wavelength over 700 nm).

The image sensor 230 may include an ADC which converts an analog electric signal to a digital electric signal. The image sensor 230 may include a memory (not shown) therein. The image sensor 230 may temporarily store the digital electric signal, that is, the data output from the pixel in the memory and output the data to an external circuit (e.g., the processor 120 or the memory 130). The image sensor 230 may include an interface used for the data input and output, and may output the data to the external circuit according to an output speed of the interface.

The image sensor 230 may include a pixel array including a plurality of pixels. The pixel array may include a photo diode which transforms light received from outside to an analog electric signal. For example, if the pixel array of the image sensor 230 receives the light from outside, photoelectric transformation occurs in at least one pixel of the pixel array and thus the received light may be transformed to the electric signal. The band of the photoelectric-transformed light varies depending on a material of the image sensor 230. According to an embodiment, the image sensor 230 may be formed with silicon. The electronic device 101 may acquire an image corresponding to the object by transforming the light passing the lens assembly 210 and the filter 410 from the object, to the electric signal through the image sensor 230.

According to an embodiment, the pixels of the pixel array of the image sensor 230 may include a filter which rejects or passes only specific band light. The filters may be mounted on the pixels of the pixel array. The filters mounted on the pixels may or may not transfer the specific wave bandwidth light of the light passing the lens assembly 210, to the photo diode.

For example, the filter 410 may be a filter for passing specific wave bandwidth light. The filter may not be mounted on the first pixel, and the filter for passing specific wave bandwidth (e.g., 940 nm) light may be mounted on the second pixel. The first pixel may generate pixel information based on the light of the first wave bandwidth (e.g., 810 nm) and the second wave bandwidth (e.g., 940 nm), and the second pixel may generate pixel information based on the filter for passing only the second wave bandwidth (e.g., 940 nm) light.

For example, the filter 410 may include first filters and second filters. The pixel array may arrange the first pixels and the second pixels in a grid. The first filter may be mounted on the first filter, and the second filter may be mounted on the second pixel. The first filter may be a band pass filter for passing the light of the first wave bandwidth (e.g., 810 nm) and the second wave bandwidth (e.g., 940 nm), and the second filter may be a filter for passing the second wave bandwidth (e.g., 940 nm) light.

The printed circuit board 420 may be electrically coupled to the image sensor 230 and the image signal processor 260. The printed circuit board 420 may forward the electrical signal generated at the image sensor 230 to the image signal processor 260.

FIG. 4 depicts an example of the camera module 180, the components of FIG. 4 may be combined in various manners, and the electronic device may include one or more of the components.

Figure 5:
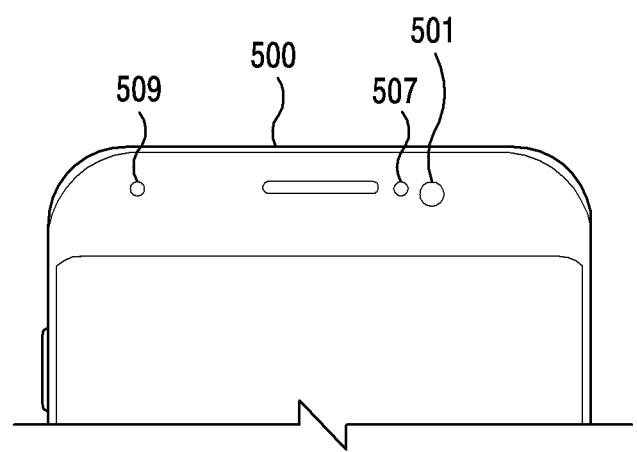
FIG. 5 is a diagram illustrating an example structure of an electronic device according to various embodiments.

FIG. 5 is a diagram illustrating an example structure of an electronic device according to various embodiments. The electronic device 500 of FIG. 5 may be the electronic device 101 of FIG. 1.

According to an embodiment, the electronic device 500 may include a camera module 501 (e.g., the camera module 320 of FIG. 3) for recognizing an object using light of a first wave bandwidth and a second wave bandwidth of the infrared band, an infrared light source 507 (e.g., the first light emitter 330 of FIG. 3) for outputting the first wave bandwidth light of the infrared band, and an infrared light source 509 (e.g., the second light emitter 340 of FIG. 3) for outputting the second wave bandwidth light of the infrared band.

The camera module 501 may generate first pixel information based on the light of the first and second wave bandwidths and second pixel information based on the second wave bandwidth light. For example, the first wave bandwidth may be 810 nm band, and the second wave bandwidth may be 940 nm band.

The electronic device 500 may recognize an object through the camera module 501, based on the first wave bandwidth light output from the infrared light source 507 and the second wave bandwidth light output from the infrared light source 509. For example, the electronic device 500 may scan a user's iris using the infrared light 810 nm output from the infrared light source 507 and obtain depth information from the object using the infrared light 940 nm output from the infrared light source 509.

Various example embodiments of the present disclosure may be realized through the electronic device 500, but not limited to, using the light of the multiple bands with the single infrared camera. The camera module may be exposed to outside through part of a housing of the electronic device 500. For example, camera modules may be mounted in part of a front surface or a rear surface of the electronic device 500.

Figure 6:
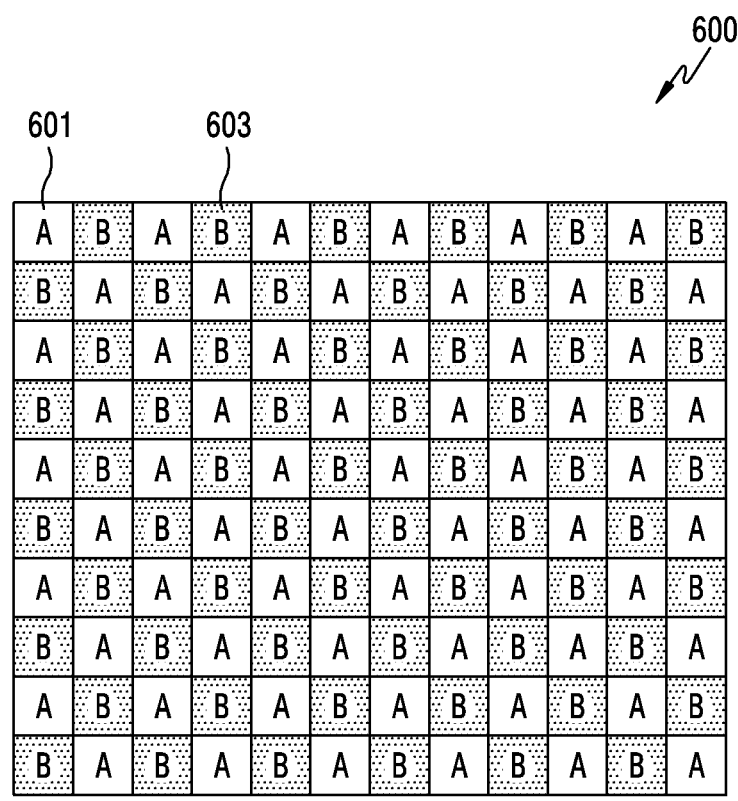
FIG. 6 is a diagram illustrating an example structure of a pixel array of an image sensor of an electronic device according to various embodiments.

FIG. 6 is a diagram illustrating an example structure of a pixel array of an image sensor of an electronic device according to various embodiments.

Referring to FIG. 6, the electronic device 101 may include at least one image sensor 230. The image sensor 230 may include a pixel array 600 including a plurality of pixels 601 and 603.

The image sensor (e.g., the image sensor 230 of FIG. 2, the image sensor 325 of FIG. 3) may include pixel arrays of a grid structure which alternates first pixels 601 (e.g., A pixels) and second pixels 603 (e.g., B pixels). The first pixel 601 and the second pixel 603 of the pixel array are alternated at 1:1 in FIG. 6. However, the first pixel 601 and the second pixel 603 may be alternated in a different ratio (e.g., 4:1, 8:1, etc.).

A first light emitter (e.g., the first light emitter 330 of FIG. 3) may output light of 801 nm which is the first wave bandwidth, and a second light emitter (e.g., the second light emitter 340 of FIG. 3) may output light of 940 nm which is the second wave bandwidth. The light of the first wave bandwidth and the second wave bandwidth reflected from an external object may be input to the first pixel 601 and the second 603 of the pixel array.

According to an embodiment, the first pixel 601 of the pixel array 600 may be used to sense the infrared light of 810 nm and 940 nm. For example, if the pixel array 600 of the image sensor 230 receives the infrared light of 810 nm and 940 nm, the photoelectric transformation may occur at the first pixel 601, to transform the received light to the electric signal. The first pixel 601 may not include a filter, and may receive the light of the first wave bandwidth output from the first light emitter and the light of the second wave bandwidth output from the second light emitter. A band pass filter for passing the light of the first wave bandwidth 810 nm and the second wave bandwidth 940 nm may be mounted on the first pixel 601, to receive the light of the first wave bandwidth and the second wave bandwidth. The electronic device 101 may obtain iris information, based on the electric signal generated from the first pixel 601.

According to an embodiment, a band pass filter for passing the light of the second wave bandwidth may be mounted on the second pixel 603 of the pixel array 600. If the pixel array 600 receives the light of the first wave bandwidth and the second wave bandwidth, the filter may pass the second wave bandwidth light and the second pixel 603 may generate pixel information by receiving the second wave bandwidth light. For example, if the pixel array 600 of the image sensor 230 receives the infrared light of 810 nm and 940 nm, the filter may pass the light of 940 nm and the second pixel 603 may photoelectric-transform the received light to an electric signal. Based on the electric signal generated from the second pixel 603, the electronic device 101 may acquire depth information of the object by measuring a distance between the electronic device 101 and the object or obtaining movement information of the object.

Figure 7:
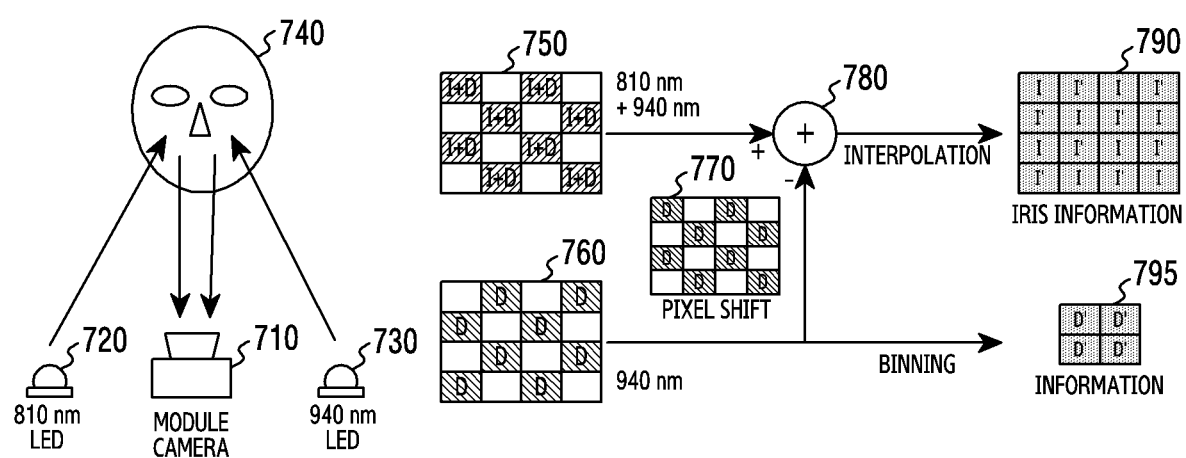
FIG. 7 is a diagram illustrating an example of acquiring information of multiple wave bandwidths at the same time in an electronic device according to various embodiments.

FIG. 7 is a diagram illustrating an example of acquiring information of multiple wave bandwidths at the same time in an electronic device according to various embodiments. In various embodiments, FIG. 1 may illustrate a control circuit of the processor.

Referring to FIG. 7, the processor (e.g., the processor 310 of FIG. 3) (not shown) may control the electronic device to output light of first and second wave bandwidths to an object 740 (e.g., the object 350 of FIG. 3) by driving both of a first light emitter 720 (e.g., the first light emitter 330 of FIG. 3) and a second light emitter 730 (e.g., the second light emitter 340 of FIG. 3). The light of the first and second wave bandwidths may be reflected from the object 740 and input to a camera module 710 (e.g., the camera module 320 of FIG. 3).

The camera module 710 may include an image sensor (e.g., the image sensor 325 of FIG. 3). The image sensor may include a pixel array constructed as shown in FIG. 6. In the pixel array, a first pixel (e.g., the A first pixel 610 of FIG. 6) may not include a filter, or may include a filter for passing the light of the first and second wave bandwidths. Hence, the first pixel of the pixel array may receive and transform the mixed light of the first and second wave bandwidths to an electric signal 750. The second pixel (e.g., the B pixel 603 of FIG. 6) of the pixel array may include the filter which passes the second wave bandwidth light. Hence, the second pixel of the pixel array may receive and transform the light of the second wave bandwidth to an electric signal 760.

The first wave bandwidth signal may be extracted by removing the second wave bandwidth signal from the mixed signal of the first and second wave bandwidths output from the first pixel. For example, the first wave bandwidth signal may be extracted by removing the second pixel output signal 760 from the first pixel output signal 750. The first pixel and the second pixel may be alternated in a grid of the pixel array, and thus first pixel information 750 and second pixel information 760 may be extracted from the pixel array. Second pixel information 760 may be pixel-shifted to match the extraction positions of the first pixel information 770. The processor may extract the first wave bandwidth signal by removing the second wave bandwidth signal based on the shifted second pixel information 770 from the first pixel information 780. The processor may generate a first image by interpolating the extracted first wave bandwidth signals 790. The processor may generate a second image by binning the second pixel information 760.

For example, the first image may be an image for the iris scanning, and the second image may be an image for the depth information acquisition. For example, the first wave bandwidth may be 810 nm, and the second wave bandwidth may be 940 nm. For example, the second image may be a face image lighted with a structured light pattern of 940 nm, and thus the depth information (e.g., pointcloud) may be acquired. The electronic device may extract the iris image and the depth information at the same time. If the processor drives both of the first light emitter 720 and the second light emitter 730, the light of the first wave bandwidth 810 nm and the second wave bandwidth 940 nm may be reflected from the object 740 and input to the image sensor at the same time. The first pixel (I pixel, BW pixel) of the image sensor may output the first pixel information based on the mixed light of the wave bandwidths 810 nm+940 nm, and the second pixel (D pixel) may output the second pixel information based on the wave bandwidth 940 nm. The first wave bandwidth signal of 810 nm of the first pixel information may be acquired by removing the 940 nm signal from the mixed light of the wave bandwidths 810 nm+940 nm. The processor may generate the first image which is the iris image 790 by interpolating the signal with the second wave bandwidth signal removed from the first pixel information, and may generate the second image to extract the depth information by binning the second pixel information 795. The processor may use the iris image and the depth information to conduct complex authentication or to detect a fake image for security enhancement.

Figure 8:
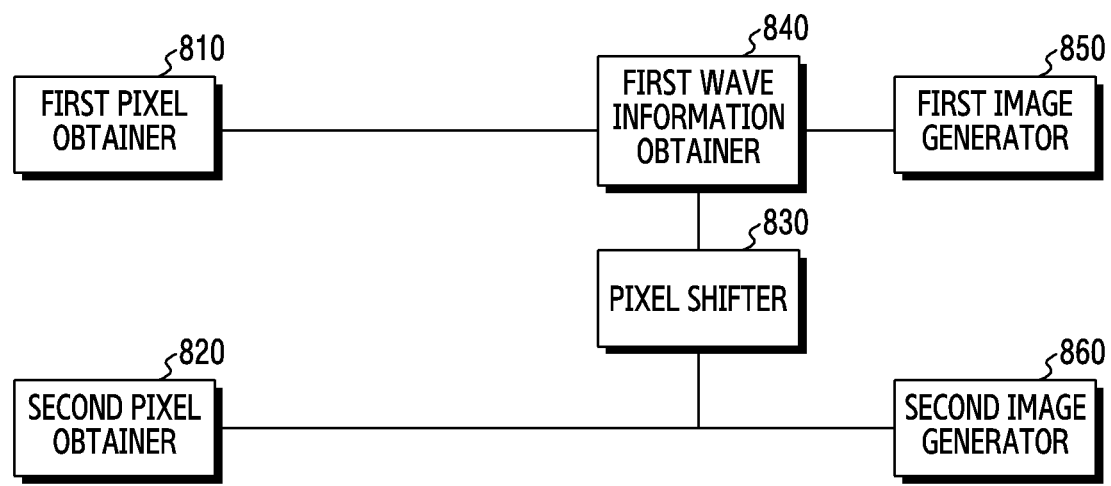
FIG. 8 is a diagram illustrating an example of generating an image in an electronic device according to various embodiments.

FIG. 8 is a diagram illustrating an example of image generation in an electronic device according to various embodiments.

Referring to FIG. 8, a processor (e.g., the processor 310 of FIG. 3) may include a first pixel obtainer (e.g., including pixel obtaining circuitry) 810, a second pixel obtainer (e.g., including second pixel obtaining circuitry) 820, a pixel shifter (e.g., including pixel shifting circuitry) 830, a first wave information obtainer (e.g., including first wave information obtaining circuitry) 840, a first image generator (e.g., including image generating circuitry) 850, and a second image generator (e.g., including image generating circuitry) 860. For example, the processor may be the processor 120 of FIG. 1. For example, the processor may be the image signal processor 260 of FIG. 2.

The first pixel obtainer 810 may include various circuitry and obtain information output from first pixels of an image sensor (e.g., the image sensor 230 of FIG. 2, the image sensor 325 of FIG. 3). The first pixel may not include a filter, or may include a band pass filter for passing first and second wave bandwidth light. The first pixel obtainer 810 may obtain first and second wave bandwidth information output from the first pixels of the image sensor.

The second pixel obtainer 820 may include various circuitry and obtain information output from second pixels of the image sensor (e.g., the image sensor 230 of FIG. 2, the image sensor 325 of FIG. 3). The second pixel may include a band pass filter for passing the second wave bandwidth light. The second pixel obtainer 820 may obtain second wave bandwidth information output from the second pixels of the image sensor.

The pixel shifter 830 may include various circuitry and shift the second pixel information obtained at the second pixel obtainer 820 to match the first pixel information in position. For example, the pixel shifter 830 may shift the second pixels by one pixel horizontally or vertically to overlap the first pixels in position.

The first wave information obtainer 840 may include various circuitry and remove the second pixel information from the first pixel information output from the first pixel obtainer 810, based on the second pixel information output from the pixel shifter 830. The first pixel information may be a mixture of the first and second wave bandwidth information. The first image may be generated based on the first wave bandwidth information. In various embodiments, the first wave information obtainer 840 may extract the first wave bandwidth information by removing the second wave bandwidth information from the first pixel information which is the mixture of the first and second wave bandwidth information. The first wave information obtainer 840 may include a calculator which subtracts the second pixel information from the first pixel information.

The first image generator 850 may include various circuitry and generate the first image by interpolating information output from the first wave information obtainer 840. The pixel array of the image sensor may have a grid structure which alternates the first pixel and the second pixel as shown in FIG. 6. Hence, the first pixel information may not be obtained at the positions of the second pixels in the pixel array. The first image generator 850 may pad second pixel information with the first wave information by interpolating information obtained from the first wave information obtainer 840.

The second image generator 860 may include various circuitry and generate the second image by binning the second pixel information obtained from the second pixel obtainer 820.

The first image and the second image generated at the processor may be combined to perform a function such as authentication. For example, the first image based on the first wave bandwidth (810 nm) information may be an iris image, and the second wave bandwidth (940 nm) information may be depth information. The processor may perform the iris scanning based on the first image (the iris image) and the second image (the depth information).

According to various embodiments, an electronic device may include a first light emitter comprising first light emitting circuitry configured to output light of a first wave bandwidth, a second light emitter comprising second light emitting circuitry configured to output light of a second wave bandwidth, a camera including an image sensor configured to arrange one or more pixels for sensing the light corresponding to the first wave bandwidth and the second wave bandwidth and to arrange one or more second pixels for sensing the light corresponding to the second wave bandwidth, and a processor electrically coupled to the image sensor and including a control circuit connected to an application processor through a designated interface. The control circuit may be configured to control the camera to obtain image data of an external object from the first wave bandwidth light output from the first light emitter and the second wave bandwidth light output from the second light emitter, which are reflected from the external object, to generate first image data of the external object using a difference between first pixel data corresponding to the one or more first pixels and second pixel data corresponding to the one or more second pixels of the image data, to generate second image data of the external object by binning the second pixel data corresponding to the one or more second pixels of the image data, and to transmit the first image data and the second image data to the processor through the designated interface, wherein the processor is configured to generate authentication information based on the first image data and to generate depth information using the second image data.

According to various embodiments, the processor may be configured to output the first wave bandwidth light using a first light source and output the second wave bandwidth light using a second light source.

According to various embodiments, the control circuit is configured to shift the second pixel data to correspond to the first pixel data in position, and to generate a first image of pixel data of the first wave bandwidth by removing the second pixel data from the first pixel data based on the shifted second pixel data.

According to various embodiments, the control circuit may be configured to, as part of generating the first image data, generate an interpolation value using a difference of pixel data of the first wave bandwidth at the second pixel data position of the first image.

According to various embodiments, the first wave bandwidth may be to acquire an iris image, and the second wave bandwidth may be to acquire depth information.

According to various embodiments, the processor may be configured to authenticate the external object, using at least the authentication information and the depth information.

According to various embodiments, the authentication may be iris authentication.

According to various embodiments, an electronic device may include a first light emitter comprising first light emitting circuitry configured to output light of a first wave bandwidth, a second light emitter comprising light emitting circuitry configured to output light of a second wave bandwidth, a camera including a pixel array including one or more first pixels configured to transform the light of the first wave bandwidth and the second wave bandwidth to a first electric signal and one or more second pixels configured to transform the light of the second wave bandwidth to a second electric signal, and an image sensor including one or more filters mounted on at least part of the one or more second pixels and passing the light of the second wave bandwidth, and a processor. The processor may be configured to control the electronic device output the light of the first wave bandwidth using a first light source and to output the light of the second wave bandwidth using a second light source, to generate a first image using a difference between the first signal and the second signal, and to generate a second image using the second signal.

According to various embodiments, the pixel array may arrange the first pixels and the second pixels in a grid.

According to various embodiments, the electronic device may further include a filter mounted on the first pixel and passing the light of the first wave bandwidth and the second wave bandwidth.

According to various embodiments, the processor may be configured control the camera to obtain image data of an external object from the first wave bandwidth light and the second wave bandwidth light which are reflected from the external object, to generate first image data of the external object using a difference between first pixel data corresponding to the one or more first pixels and second pixel data corresponding to the one or more second pixels of the image data, to generate second image data of the external object by binning the second pixel data corresponding to the one or more second pixels of the image data, and to transmit the first image data and the second image data to the processor through a designated interface, wherein the processor is configured to generate authentication information based on the first image data and to generate depth information using the second image data.

According to various embodiments, the processor may be configured to shift the second pixel data to correspond to the first pixel data in position, and generate a first image of pixel data of the first wave bandwidth by removing the second pixel data from the first pixel data based on the shifted second pixel data.

According to various embodiments, the processor may be configured to, as part of generating the first image data, generate an interpolation value using a difference of pixel data of the first wave bandwidth at second pixel data positions of the first image.

Figure 9:
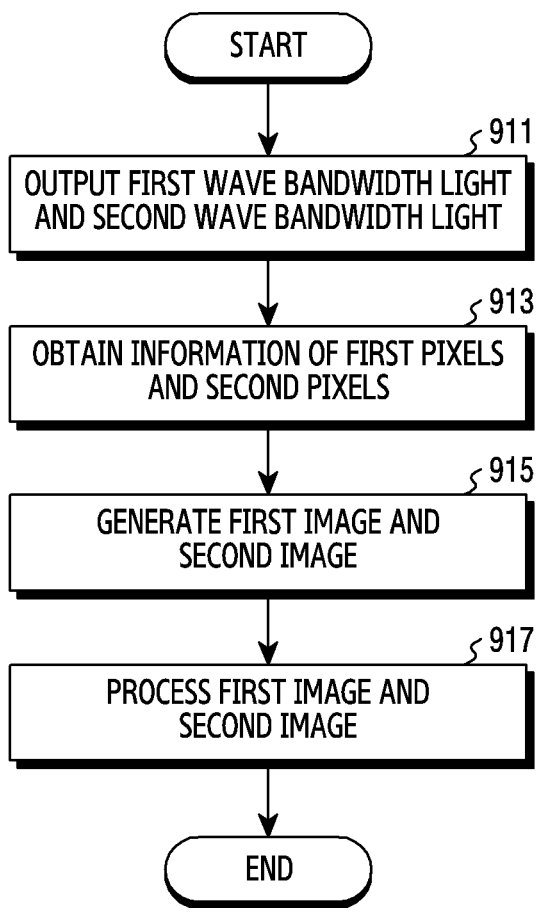
FIG. 9 is a flowchart illustrating an example of processing an image in an electronic device according to various embodiments.

FIG. 9 is a flowchart illustrating an example of processing an image in an electronic device according to various embodiments.

Referring to FIG. 9, a processor (e.g., the processor 310 of FIG. 3) may output light of first and second wave bandwidths to the object 740 (e.g., the object 350 of FIG. 3) by driving both of a first light emitter (e.g., the first light emitter 330 of FIG. 3) and a second light emitter (e.g., the second light emitter 340 of FIG. 3) in operation 911. For example, the processor may be the processor 120 of FIG. 1. For example, the processor may be the image signal processor 260 of FIG. 2.

The light of the first and second wave bandwidths may be reflected from the object and input to a camera module (e.g., the camera module 180 of FIG. 1, the camera module 320 of FIG. 2 and FIG. 3). The camera module may include an image sensor (e.g., the image sensor 325 of FIG. 3). The image sensor may include a pixel array including the first pixels and the second pixels in the structure as shown in FIG. 6. In the pixel array, the first pixel (e.g., the A first pixel 610 of FIG. 6) may not include a filter, or may include a filter for passing the light of the first and second wave bandwidths. Hence, the first pixel of the pixel array may receive and transform the mixed light of the first and second wave bandwidths to an electric signal. The second pixel (e.g., the B pixel 603 of FIG. 6) of the pixel array may include a filter which passes the second wave bandwidth light. Accordingly, the second pixel of the pixel array may receive and transform the second wave bandwidth light to an electric signal. The processor may obtain information of the first pixels and the second pixels in operation 913.

In operation 915, the processor may generate a first image and a second image based on the first pixel information and the second pixel information. The first image may be based on the first wave bandwidth information, and the second image may be based on the second wave bandwidth information. The processor may generate the images based on the first wave bandwidth and the second wave bandwidth respectively, at the same time by outputting both of the first and second wave bandwidth light to the object.

In operation 917, the processor may process the first and second image by performing a designated function based on the generated first image and second image. The designated function may be an authentication function based on the image. For example, the first image may be an iris image, and the second image may be depth information. The processor may authenticate user's iris information based on the iris image and the depth information.

Figure 10:
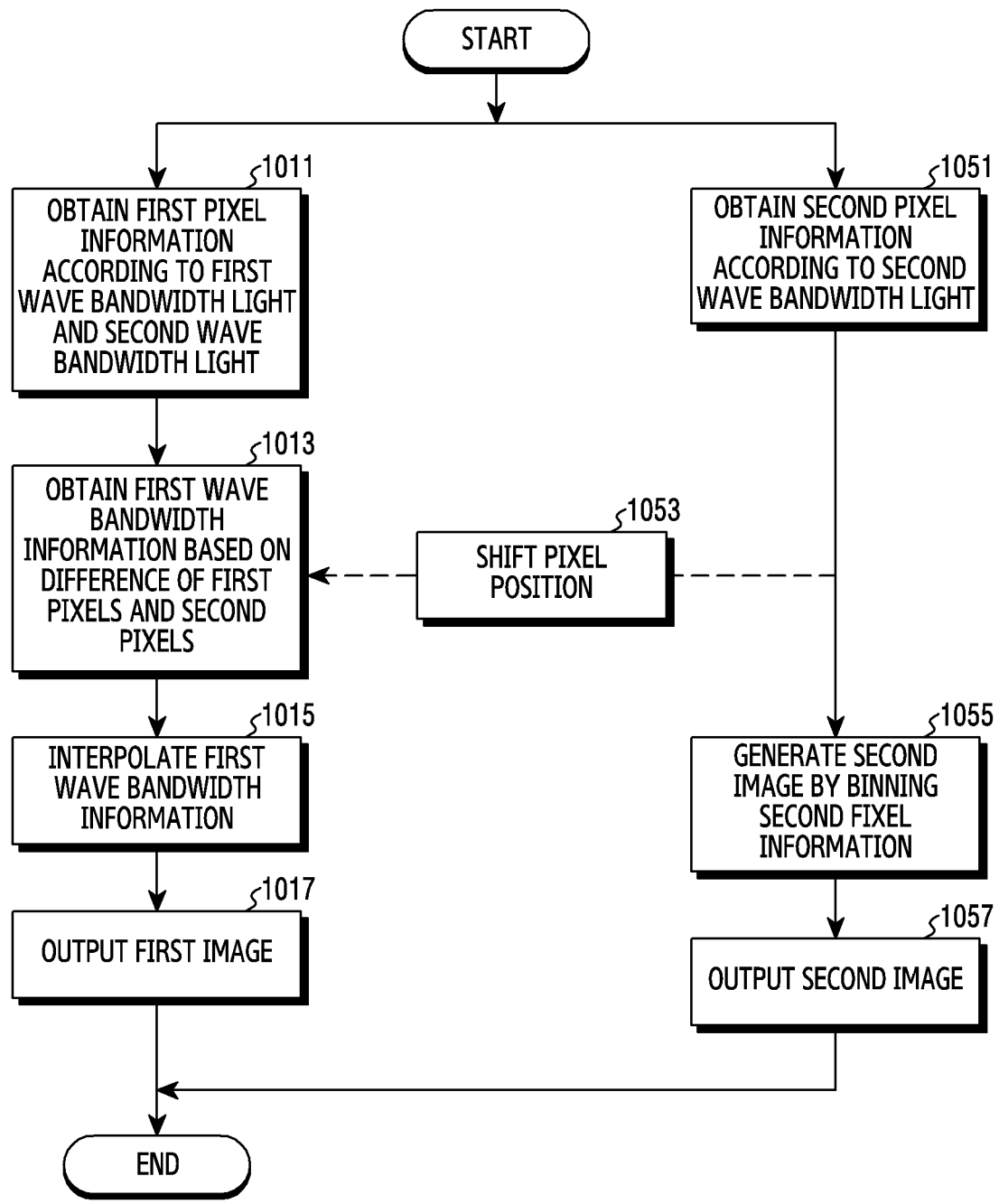
FIG. 10 is a flowchart illustrating an example of generating an image in an electronic device according to various embodiments.

FIG. 10 is a diagram illustrating an example of image generation in an electronic device according to various embodiments.

Referring to FIG. 10, a processor (e.g., the processor 310 of FIG. 3) may obtain first pixel information in operation 1011. The first pixel information may be mixture of first and second wave bandwidth information. The processor may obtain second pixel information in operation 1051. The second pixel information may be second wave bandwidth information. In operation 1053, the processor may shift the second pixel information to match second pixels to first pixels in the position. In operation 1013, the processor may remove the second pixel information from the first pixel information, based on the shifted second pixel information. For example, the processor may extract the first wave bandwidth information by removing the second pixel information of the second wave bandwidth from the first pixel information which is the mixture of the first and second wave bandwidth information. In operation 1015, the processor may generate a first image by interpolating the first wave bandwidth and padding the second pixel positions with the first wave bandwidth information. The processor may output the first image generated in operation 1017. The processor may generate a second image by binning the second pixel information in operation 1055. In operation 1057, the processor may output the generated second image.

The first image may include iris information, and the second image may include depth information of the iris image. The processor may drive a plurality of light emitters at the same time, and acquire both of the iris image and the iris image depth information through an image sensor. The processor may perform a complex authentication function using the iris image and the depth information.

According to various embodiments, a method for generating an image in an electronic device may include generating first light of a first wave bandwidth and second light of a second wave bandwidth, obtaining image data of an external object from light reflected from the external object using an image sensor which arranges one or more pixels for sensing the light corresponding to the first wave bandwidth and the second wave bandwidth and one or more second pixels for sensing the light corresponding to the second wave bandwidth, generating first image data of the external object using a difference between first pixel data corresponding to the one or more first pixels and second pixel data corresponding to the one or more second pixels of the image data, generating second image data of the external object by binning the second pixel data corresponding to the one or more second pixels of the image data, and transmitting the first image data and the second image data to an application processor through a designated interface, to generate authentication information based on the first image data and to generate depth information using the second image data.

According to various embodiments, generating the first image data may include shifting the second pixel data to correspond to the first pixel data in position, and generating a first image of the pixel data of the first wave bandwidth by removing the second pixel data from the first pixel data based on the shifted second pixel data.

According to various embodiments, generating the first image data may further include generating an interpolation value using a difference of the pixel data of the first wave bandwidth at second pixel data positions of the first image.

According to various embodiments, generating the second image data may include acquiring first pixel data according to the second wave bandwidth light, and generating a second image by binning the acquired first pixel data.

According to various embodiments, the first wave bandwidth may be to acquire an iris image, and the second wave bandwidth may be to acquire depth information.

According to various embodiments, the method may further include authenticating the external object, using at least the authentication information and the depth information.

According to various embodiments, the authentication may be iris authentication.

An electronic device according to various embodiments may acquire a plurality of images of different wave bandwidths using the single image sensor at the same time, and rapidly parallel-process the acquired images. For example, the electronic device may perform the iris scanning and the depth information extraction at the same time, and thus acquire the two information rapidly. By use of the single image sensor, the electronic device according to various embodiments may reduce its physical hardware size. Therefore, it may be easily applied to a small mobile device and the iris scanning may be improved far more using the two information.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:
1. An electronic device comprising:
   a first light emitter comprising first light emitting circuitry configured to output first IR (infra-red) light of a first wave bandwidth;
   a second light emitter comprising second light emitting circuitry configured to output second IR light of a second wave bandwidth, wherein the second wave bandwidth is different from the first wave bandwidth;
   a camera comprising an image sensor comprising a plurality of first pixels for sensing the first IR light corresponding to the first wave bandwidth and the second IR light corresponding to the second wave bandwidth and a plurality of second pixels for sensing the second IR light corresponding to the second wave bandwidth, wherein the plurality of first pixels and the plurality of second pixels are arranged in a grid which alternates each of the first pixels and each of the second pixels; and
   a processor electrically coupled to the image sensor and comprising a control circuit connected to an application processor through a designated interface,
   wherein the control circuit is configured to:
      control the first light emitter to output the first IR light and the second light emitter to output the second IR light;

in response to the first IR light and the second IR light being output, control the image sensor to obtain first pixel data of an external object from the first IR light output from the first light emitter and the second IR light output from the second light emitter, which are reflected from the external object by using the plurality of first pixels of the image sensor, control to obtain second pixel data of the external object from the second IR light output from the second light emitter, which is reflected from the external object by using the plurality of second pixels of the image sensor, shift the second pixel data corresponding to the plurality of second pixels of the image sensor by one pixel horizontally or vertically to correspond in position to first pixel data corresponding to the plurality of first pixels of the image sensor, generate first image data of the external object using a difference between the first pixel data and the shifted second pixel data, generate second image data of the external object by binning the second pixel data corresponding to the plurality of second pixels of the image data, and control to transmit the first image data and the second image data to the processor through the designated interface, wherein the processor is configured to generate authentication information based on the first image data and to generate depth information using the second image data.

2. The electronic device of claim 1, wherein the control circuit is further configured to, for generating the first image data, interpolate values in the first image data corresponding to positions of the plurality of first pixels to positions of the plurality of second pixels.

3. The electronic device of claim 1, wherein the first wave bandwidth includes 810 nm, and
the second wave bandwidth includes 940 nm.

4. The electronic device of claim 1, wherein the processor is configured to authenticate the external object using at least one of the authentication information or the depth information.

5. The electronic device of claim 4, wherein the authentication includes iris authentication.

6. A method for generating an image in an electronic device, the method comprising:
outputting first IR (infra-red) light of a first wave bandwidth by a first light emitter included in the electronic device and second IR light of a second wave bandwidth by a second light emitter included in the electronic device;
in response to the first IR light and the second IR light being output:
obtaining, by using a plurality of first pixels of an image sensor included in the electronic device, first pixel data of an external object from the first IR light and the second IR light reflected from the external object and
obtaining, by using a plurality of second pixels of the image sensor, second pixel data of the external object from the second IR light reflected from the external object, wherein the image sensor comprises the plurality of first pixels for sensing the first IR light corresponding to the first wave bandwidth and the second IR light corresponding to the second wave bandwidth and the plurality of second pixels for sensing the second IR light corresponding to the second wave bandwidth, wherein the plurality of first pixels and the plurality of second pixels are arranged in a grid which alternates each of the first pixels and each of the second pixels, and wherein the second wave bandwidth is different than the first wave bandwidth;

shifting the second pixel data corresponding to the plurality of second pixels of the image sensor by one pixel horizontally or vertically to correspond in position to first pixel data corresponding to the plurality of first pixels of the image sensor;

generating first image data of the external object by using a difference between the first pixel data and the shifted second pixel data and by interpolating values in the first pixel data corresponding to positions of the plurality of first pixels to positions of the plurality of second pixels;

generating second image data of the external object by binning the second pixel data corresponding to the plurality of second pixels of the image data; and transmitting the first image data and the second image data to an application processor through a designated interface, to generate authentication information based on the first image data and to generate depth information using the second image data.

7. The method of claim 6, wherein generating the first image data further comprises interpolating values in the first image data corresponding to positions of the plurality of first pixels to positions of the plurality of second pixels.

8. The method of claim 6, wherein the first wave bandwidth includes 810 nm, and
the second wave bandwidth includes 940 nm.

9. The method of claim 6, further comprising:
authenticating the external object using at least one of the authentication information or the depth information.

10. The method of claim 9, wherein the authentication includes iris authentication.

11. An electronic device comprising:
a first light emitter comprising first light emitting circuitry configured to output light of a first wave bandwidth;
a second light emitter comprising second light emitting circuitry configured to output light of a second wave bandwidth, wherein the second wave bandwidth is different than the first wave bandwidth;
a camera comprising a pixel array comprising a plurality of first pixels configured to transform the light of the first wave bandwidth and the second wave bandwidth to a first electric signal and a plurality of second pixels configured to transform the light of the second wave bandwidth to a second electric signal, and an image sensor comprising a plurality of filters mounted on at least part of the plurality of second pixels and configured to pass the light of the second wave bandwidth, wherein the plurality of first pixels and the plurality of second pixels are arranged in a grid including a plurality of rows adjacent to each other and a plurality of columns adjacent to each other, the first pixels and the second pixels alternate between the first and second pixels in each row of the plurality of rows and in each column of the plurality of columns; and
a processor,
wherein the processor is configured to control the electronic device to output the light of the first wave bandwidth using a first light source and to output the light of the second wave bandwidth using a second light source,
to control the electronic device to obtain image data of an external object based on the first electrical signal and the second electrical signal received from the camera corresponding to first wave bandwidth light and the second wave bandwidth light reflected from the external object,
to shift each second pixel data corresponding to the plurality of second pixels of the image data by one pixel horizontally or vertically to correspond in position to the plurality of first pixels of the image data,
to generate first image data of the external object using a difference between the first pixel data and the shifted second pixel data corresponding in position to first pixel data, and
to generate second image data of the external object using the second pixel data.

12. The electronic device of claim 11, further comprising:
a filter disposed on the plurality of first pixels and configured to pass the light of the first wave bandwidth and the second wave bandwidth.

13. The electronic device of claim 11, wherein the second image data of the external object is generated by binning the second pixel data corresponding to the plurality of second pixels of the image data, and the processor is further configured to:
transmit the first image data and the second image data to an application processor through a designated interface, wherein the application processor is configured to authenticate information based on the first image data and to generate depth information using the second image data.

14. The electronic device of claim 13, wherein the processor is configured to: generate a first image of pixel data of the first wave bandwidth by removing the second pixel data from the first pixel data based on the shifted second pixel data.

15. The electronic device of claim 11, wherein the processor is further configured to, for generating the first image data, interpolate values in the first image data corresponding to positions of the plurality of first pixels to positions of the plurality of second pixels.

* * * * *